May 30, 1972   TOSHIHARU IWAI ET AL   3,666,615
COMPOSITE LAYER SHEET MATERIAL
Filed Jan. 21, 1970

INVENTORS
TOSHIHARU IWAI
KAZUKIYO YAMAZAKI

BY *Wenderoth, Lind & Ponack*
ATTORNEYS 3,666,615
COMPOSITE LAYER SHEET MATERIAL
Toshiharu Iwai and Kazukiyo Yamazaki, Fukui-shi, Japan, assignors to Nitto Denki Kogyo Kabushiki Kaisha (also known as Nitto Electric Industrial Co., Ltd.), Osaka-fu, Japan
Filed Jan. 21, 1970, Ser. No. 4,579
Int. Cl. H01b 3/40; B32b 27/26, 27/38
U.S. Cl. 161—185
8 Claims

ABSTRACT OF THE DISCLOSURE

A composite layer sheet material suitable for electrical insulation is provided by combining a thermosetting resin layer and a hardening agent layer, the hardening agent being capable of hardening the thermosetting resin layer. The two above layers are separated by a contact-preventive film layer which melts on heating and allows the thermosetting resin layer and hardening layer to react. A fiber base is embedded in either the thermosetting resin layer or hardening agent layer to provide structural support for the composite.

---

Figure 1:
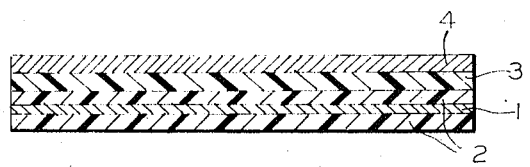

This invention relates to a composite layer sheet material, and more particularly to composite layer sheet material for use as electric insulating material which has many distingiushed characteristics. The composite layer sheet of the present invention is moderately flexible, tenacious, preservable for a long period of time at normal temperature and softens by heating. Via heat hardening, it can be given a high electric insulation capacity, mechanical strength and adhesiveness.

As a result of the recent remarkable progress of electric appliances, insulating material of various forms and qualities has been developed to meet the demand for a material of durability, efficiency and easy use.

The composite layer sheet material of the invention is cut in the shape of tape and wound helically in half-lap around a high voltage conductive bar (i.e., half of the subsequent layer overlaps the preceding layer) a rotary machine or transformer coil, or the like, and is then hardened by heating. The composite layer sheet material of the invention is also suitable for laminated moldings for electrical use or the like.

The foregoing coil, high voltage conductive bar and other electric conductors have hitherto been insulated by the use of what is known as "prepreg," consisting of fiber base member, such as glass fiber, polyethylene-terephthalate fiber and the like, the said base member being impregnated with a mixed resin solution comprising thermosetting resin, particularly epoxy resin, and hardening agent, and then semihardened by heating. The said prepreg is wound around a conductor and is then completely hardened by heating so as to form an insulating cover over the conductor.

However, the said prepreg has a disadvantage in that the hardening of the epoxy resin proceeds during storage at normal temperature because the epoxy resin and the hardening agent are in the state of admixture, as a result of which the prepreg is rendered useless. Even when the hardening reaction is rather slow during storage at normal temperature, the "resin flow" of the prepreg gradually decreases (the fluidity is lost), with the result that not only the operational efficiency is lost but the characteristics and appearance of the hardened resin are impaired due to the deterioration of the adhesiveness. Moreover, in order to prolong the life of the prepreg during the preservation it is necessary to use a high temperature hardening agent, for instance, a hardening agent of the carboxylic acid anhydride type or the aromatic amine type when employing an epoxy resin.

If such a high temperature hardening agent is used, however, the prepreg wound around the electric conductor has to be treated at high temperature for a long period of time for hardening, with the result that when insulating an electric apparatus which is susceptible to heat, the efficiency thereof may deteriorate.

Moreover, the defect that the hardening reaction of the prepreg proceeds during storage at normal temperature gives rise to another defect, i.e. the shrinking effect is impaired at the time of heating when employing a heat-shrinking fiber for the base member. Therefore, the use of the prepreg is not desirable as an insulating material.

The present inventors have found that no satisfactory result is obtainable from the conventional sheet in which epoxy resin and hardening agent are mixed in advance. This has been determined as a result of a series of experiments for the development of the novel material of the present invention which is free from the foregoing defects. The present invention therefore is directed to providing a composite layer sheet material wherein the thermosetting resin and the hardening agent are separated during storage, the said resin and hardening agent reacting on heating, thereby forming a hardened body.

The present invention therefore relates to composite layer sheet material characterized by the combination of a thermosetting resin layer, a contact preventive film layer of a heat-fusing type, and a hardening agent layer, each of the said layers adhering to the adjoining layer, a fiber base member being embedded at least in either of the foregoing thermosetting resin layer or the hardening agent layer, the said contact preventive film layer of heat-fusing type having substantially the same or slightly lower fusing temperature than that of the other two layers, the said thermosetting resin layer and hardening agent layer being separated by the contact preventive film layer of heat-fusing type in the normal state, the said contact preventive film layer of heat-fusing type being fused by heating, with the result that the thermosetting resin layer and the hardening agent layer are fused together and hardened.

The composite layer sheet material of the invention can be stored for a long period of time at normal temperature unlike the conventional prepreg wherein the epoxy resin and the hardening agent are mixed, and therefore the composite layer sheet material of the invention is particularly useful when a hardening agent of high reactivity is used for the hardening agent layer.

In case of the conventional prepreg, a hardening agent of carboxylic acid anhydride type or aromatic amine type which is rather unreactive is mostly used for the hardening of the epoxy resin, aliphatic amine type hardening agent being practically unutilizable because of the speedy progress of hardening reaction within a short period of time. This difficulty however can be successfully overcome in case of the composite layer sheet material of the present invention.

In this invention, an epoxy resin is chiefly used as a thermosetting resin for its excellent electric and mechanical characteristics, but a polyester resin, melamine, resin, phenol resin or the like is also utilizable. The use of a resin which has a melting temperature of 50–150° C. is desirable from the viewpoint of the operational efficiency of the composite layer sheet material, because a melting temperature which is too high will result in deterioration of the characteristics of the electric appliance to be insulated.

Any hardening agent is usable in the present invention insofar as it can harden the thermosetting resin used therein: for instance, diaminodiphenylmethane, imidazoline, imidazole, phthalic anhydride, pyromellitic anhydride, polyamide resin as co-reactive resin, and the like, for the hardening of epoxy resin: organic peroxide such as benzoyl peroxide, diphenyl peroxide and the like for the hardening of polyester resin; triethanolamine, imidazole and the like for silicone resin; hexamethylene tetramine, paratoluene sulfonic acid and the like for phenol resin. The details will be described in relation to the examples appearing hereinafter.

When the thermosetting resin or the hardening agent is in the liquid state, the composite layer sheet material of this invention will be sticky and inconvenient for storage as well as for use, and therefore it is necessary to add an unreactive modifier, such as polyvinyl acetate, polyvinyl alcohol, polyvinylbutyral, polyvinylacetal and the like, to the thermosetting resin or the hardening agent so as to prevent the stickiness of the thermosetting resin layer or the hardening agent layer. This enables one to obtain a composite layer sheet material which is free from stickiness and easy to handle.

As described above, the thermosetting resin layer and the hardening agent layer of this invention are formed either independently by the thermosetting resin and the hardening agent respectively or by adding an unreactive modifying substance tereto.

When the thermosetting resin or the hardening agent is powdery, its close contact to the contact preventive film layer of heat-fusing type will be unsatisfactory, and therefore it is necessary to add an unreactive modifier which is soft or adhesive, such as polyvinylbutyral, polyvinylbutylether. Particularly, if polyvinylbutylether is added to the resin, the said ether, having an effect of adhesion imparting agent, imparts an adhesive property to the thermosetting resin layer, with the result that a composite layer sheet material which is adhesive at normal temperature and hardenable by heating is obtained. Such sheet material which has adhesiveness at normal temperature makes it unneecssary to provide any terminal catch for the tape winding, as a result of which the operational efficiency is increased and the practical utility is enhanced.

Furthermore, when the composite layer sheet material of the invention possesses adhesiveness, it is advisable to cover the surface thereof with a kraft paper separator, for instance, one which is processed on one face thereof by the known anti-adhesive treatment with silicone resin for convenience of storage of the sheet material.

If the composite layer sheet material has moderate softness, the tape can be wound around the coil and other electric conductors of almost any thickness or shape without the risk of being broken at the corner.

Inorganic fabric consisting of glass fiber, asbestos fiber or the like, synthetic fabric consisting of polyester fiber, polypropylene fiber or the like, or non-woven fabric consisting of any of the said fibers is chiefly used as the fiber base member in the persent invention. By the use of the fiber base member it is possible to prevent the damage to the composite layer sheet material by an external force during storage at normal temperature, to give excellent dimensional stability to the hardened layers after the hardening reaction. moreover, such procedure prevents various undesirable phenomena, such as shrinkage, expansion and the like, which arise in the reaction-hardened layers by the influence of the change of temperature and humidity due to unevenly applied external force or other factors, the influence of chemicals, or the like.

The melting temperature of the contact preventive film layer of heat-fusing type should be substantially the same as or slightly lower than that the ol of the thermosetting resin layer and the hardening agent layer, and moreover the said film layer should be non-reactive to either the thermosetting resin or the hardening agent but of good solubility in both.

Although the thermoplastic may vary according to the sort of resin and hardening agent to be employed, those which can meet the foregoing requirements comprise the thermoplastic resin films of polyethylene, polyvinylchloride, polyethylene oxide, polyacrylate esters, copolymers of ethylene and vinyl acetate, and the thermoplastic film of gelatine or the like.

In this invention the melting temperature of the contact preventive film layer of heat-fusing type is set substantially same as or slightly lower than that of the thermosetting resin layer or the hardening agent layer. As a rule, however, it is so arranged that the difference between the melting temperature of the thermosetting resin layer and that of the hardening agent layer be within the range of 50° C. as against the melting temperature of the contact preventive film layer of heat-fusing type. The particulars will be described in relation to the examples to be set forth hereinafter.

The contact film layer of heat-fusing type should be as thin as possible, the film quantity being usually set at 0.5–1.5 gr./m.$^2$. The use of a quantity greater than 1.5 gr./m.$^2$ involves the risk of deterioration of the characteristics of the heat-hardened body. As to the method of providing the contact preventive film layer of heat-fusing type, the film can be prepared in advance, but the said film can be made thinner by coating it, dissolved in an organic solvent, on the thermosetting resin layer or the hardening agent layer and then evaporating the solvent.

As described heretofore, the composite layer sheet material of the invention is so composed that the hardening agent is completely separated from the thermosetting resin by the contact preventive film layer of heat-fusing type during storage at normal temperature, as a result of which the sheet material can be stored for a long period of time without risk of the fusion reaction proceeding until desired. The sheet material forms an excellent insulating layer, the film layer, the thermosetting resin layer and the hardening agent layer being fused together and hardened when the said sheet material is wound around electric conductors, coils and the like and heat is applied thereto.

Furthermore, the existence of fiber base member in the composition of the composite layer sheet material of the invention not only serves to prevent damage of the sheet material from external force during the storage thereof at normal temperature but imparts excellent mechanical strength to the bonded layer after the hardening reaction produced by heating. The composite layer sheet material of the invention is also utilizable as an adhesive sheet with which to bind two or more objects together.

If a fiber base member which has heat-shrinking property is used, it is advisable to choose such a shrinking temperature that the contact preventive film layer of heat-fusing type will be fused first, the thermosetting and the hardening agent being fused next, the shrinkable fiber base member being heat-shrunk thereafter. In case a shrinkable fiber base member is employed for the composite layer sheet material to be used as insulating material for electric appliances, it is necessary to choose such member of which the shrinking temperature is 90–150° C. If the shrinking temperature is too high, it involves the risk of deterioration of the characteristics of the electric appliance.

The following is one of the modes of use of the composite layer sheet material of the invention: the said material is cut into tape and would in half-lap around a coil, heat-shrinking polyethylene terephthalate film tape being wound thereon and the composite is heat-hardened in a hot-air drier.

As described heretofore, the composite layer sheet material of the invention can be stored for a long period of time, and moreover is free from variation of the "resin flow" even in the course of the long-term storage unlike a conventional prepreg, with the result that very high operational efficiency can be maintained. For example, even when said sheet material is found around a high voltage conductive bar, a rotary machine or transformer coil and is then hardened by heating, the adhesiveness between the hardened material and said bar or coil is never lost.

The composite layer sheet material of the invention is provided with a contact preventive film layer of heat-fusing type which prevents the reaction between the thermosetting resin and the hardening agent during the preservation at normal temperature. This arrangement therefore enables one to utilize a highly reactive hardening agent, thereby obtaining a composite layer sheet material of rapid hardening properties.

Figure 2:
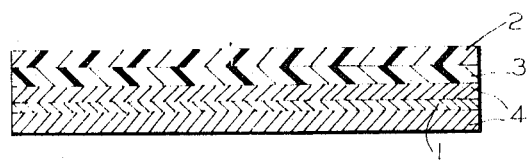
Figure 3:
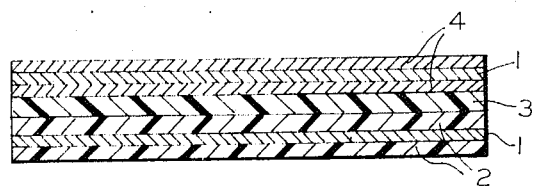

FIGS. 1, 2 and 3 are the vertical sections of the composite layer sheet material showing preferred examples of the invention, the details of which will be described hereunder.

EXAMPLE 1

Epoxy resin (trade name: Epicoat No. 1001; melting temperature: 64-76° C. marketed by Shell Petroleum Company Ltd. (England) is dissolved in methylisobutylketone-toluene (in equal parts by volume), thereby obtaining a 50% basic solution). Glass cloth (trade name: LPC–131H$_2$; thickness: 0.15 mm.) marketed by Arisawa Mfg. Co., Ltd. (Japan) is impregnated with the said basic solution and is then dried at 80° C. for 20 minutes, thereby obtaining a fiber-reinforced resin sheet with a coating density of 164 gr./m.$^2$.

The said sheet is coated on one face thereof with a 50% methanol solution of vinyl acetate resin (product of Nissetsu Co., Ltd., Japan, trade name: P–170; melting temperature: 50–60° C.), and is then dried at 80° C. for 10 minutes, thereby obtaining contact preventive film layer of heat-fusing type with a density of 15 gr./m.$^2$.

Next, a 40% toluene solution of polyamide resin (trade name: Tomide No. 410; fusing temperature: 60–70° C.) marketed by Fuji Kasei Co., Ltd. (Japan) is coated as hardening agent (co-reactive resin in this case) layer on the foregoing contact preventive film layer of heat-fusing type, and is then dried at 80° C. for 20 minutes (coating density 165 gr./m.$^2$), thereby obtaining the composite layer sheet material of the invention. The composition thereof is shown in FIG. 1, in which the numeral 1 is glass cloth, 2 being the epoxy resin layer, 3 being the contact preventive film layer of heat-fusing type, 4 being hardening agent layer.

The composite layer sheet material thus obtained is cut into tape in 1.9 mm. width after 5 months' storage at room temperature, the tape being then wound in half-lap around a conductor (a copper rod) 2 cm. in diameter and being subjected to a pressure of 5 kg./cm.$^2$ in a metal casting mold at 150° C. for 10 minutes, thereby providing a 1.5 mm. thick insulating cover layer. This cover layer showed excellent insulating characteristics: dielectric breakdown strength 20 kv./mm. and volume resistivity $1.0 \times 10^{15}$ Ω cm. The composite layer sheet material after 5 months' storage showed no difference with respect to both appearance and quality as compared with that immediately after production. The characteristics after the hardening process are also substantially same in both cases.

EXAMPLE 2

Glass cloth (trade name: LPC–131H$_2$) marketed by Arisawa Mfg. Co., Ltd. (Japan) is impregnated with a 15% methanol solution of weight ratio 1:2 mixture of 2-undecyl imidazoline (product of Shikoku Kasei Co., Ltd., Japan, trade name: C$_{11}$ZL; fusing temperature: 83° C.) as the hardening agent and vinyl acetate resin (product of Nissetsu Co., Ltd., Japan, trade name; P–170; fusing temperature: 50–60° C.) as the non-reactive modifying substance. The material is dried at 85° C. for 15 minutes, thereby obtaining hardening agent impregnated fiber sheet with a coating density of 15 gr./m.$^2$.

The said sheet is coated on one face thereof with a 10% toluol solution of co-polymer of ethylene and vinyl acetate (product of Mitsui Polychemical Co., Ltd., Japan, trade name: ELVAX–150; fusing temperature: 61° C.), and is then dried at 80° C. for 15 minutes, thereby providing contact preventive film layer of heat-fusing type with a coating density of 10 gr./m.$^2$.

Next, a 40% solution of methylisobutylketone-toluene (in equal parts by volume) and a mixture of epoxy resins (product of Shell Petroleum Company Ltd., England, trade name: Epicoat No. 1001 and Epon No. 1007; equal parts by weight, melting temperature: 70–80° C.) as the thermosetting resin is coated on the said contact preventive film layer of heat-fusing type, and is then dried at 80° C. for 15 minutes (coating density 100 gr./m.$^2$), thereby obtaining the composite layer sheet material of the invention. The composition thereof is shown in FIG. 2.

The composite layer sheet material thus produced was cut into tape of 19 mm. width after 4 months' storage at room temperature, the said tape being then wound in half-lap around a copper rod 2 cm. in diameter, placed in a metal mold and hardened under a pressure of 5 kg./cm.$^2$ at 150° for 10 minutes, thereby obtaining insulating cover layer 1.5 mm. in thickness. This insulating cover layer had a dielectric breakdown strength of 30 kv./mm. and volume resistivity of $5 \times 10^{15}$ Ω cm. The composite layer sheet material after 4 months' storage showed no difference in respect of both appearance and quality as compared with that immediately after production, all the characteristics after hardening also being substantially same in both cases.

In FIG. 2, numeral 1 referes to the glass cloth; 2 to the thermosetting resin layer; 3 to the contact preventive film layer and 4 to the hardening agent layer.

EXAMPLE NO. 3

Epoxy resin (trade name: Epicoat No. 1031); melting temperature: 80° C.) marketed by Shell Petroleum Company Ltd. (England) is dissolved in acetone-methylsiobutylketone-toluene in equal parts by volume, thereby preparing a 45% solution. Then, heat-shrinkable polyethylene terephthalate fabric (product of Teijin Ltd., Japan, trade name: Tetoron Cloth No. 3305; thickness: 0.005 mm.) without heat-set is impregnated with the said solution, and is then dried at 95° for 20 minutes, thereby obtaining fiber-resinforced resin sheet with a density of 130 gr./m.$^2$.

The said resin sheet is coated on one face thereof with a 5% solution of polyethylene oxide resin (product of Meisei Chemical Industry Co., Ltd., Japan, trade name: Alcox E–30; melting temperature: 65–67° C.), and is then dried at 90° C. for 15 minutes, thereby providing contact preventive film layer of heat-fusing type with a coating density of 5 gr./cm.$^2$.

Next, the said contact preventive film layer of heat-fusing type is coated with a 15% methanol solution of weight ratio 1:2 mixture of imidazole (product of BASF Ltd., Germany trade name: Z; fusing temperature: 88° C.) as a hardening agent layer and vinyl acetate resin (product of Nissetsu Co., Ltd., Japan, trade name: P–170) as an unreactive modifying agent for the purpose of imparting melt viscosity and adhesiveness to the surface, and the composite is then dried at 75° C. for 15 minutes, thereby producing composite layer sheet material with a coating density of 15 gr./m.$^2$.

The composite layer sheet material thus obtained was cut into tape in 19 mm. width after 2 months preservation at 40° C., the said tape being then wound in half-lap around a coil, bound with shrinkable Tetoron film tape and is then shrink-hardened at 120° C. for 30 minutes.

EXAMPLE NO. 4

Glass cloth (product of Arisawa Mfg. Co., Ltd., Japan, trade name: LPC–131H$_2$) is impregnated with a 60% toluene solution of silicone resin (product of Shin-etsu Chemical Industry Co., Ltd., Japan, trade name: KR–226; fusing temperature: 60°), and then is dried at 110° C. for 15 minutes, thereby obtaining fiber-reinforced resin sheet with a coating density of 110 gr./m.$^2$.

The said sheet is coated on one face thereof with a 10% toluene solution of vinyl acetate resin (product of Nissetsu Co., Ltd., Japan, trade name: P–170), and is then dried at 90° C. for 15 minutes, thereby providing a contact preventive film layer of heat-fusing type with a coating density of 5 gr./m.$^2$. Next, the said contact preventive film layer of heat-fusing type is coated with a 15% methanol solution of imidazole (product of Shikoku Kasei Co., Ltd., Japn, trade name: Z), and is then dried at 80° C. for 15 minutes, thereby obtaining a composite layer sheet material with a coating density of 10 gr./m.$^2$.

After 6 months' storage at room temperature, the sheet material piled in 7 layers was subjected to a pressure of 5 kg./m.$^2$ at 150° C. for 10 minutes, thereby obtaining a laminated sheet 1.0 mm. in thickness. This laminated sheet had a bonding strength 13 kg./cm.$^2$, dielectric breakdown strength 15 kv./mm., volume resistivity $5 \times 10^{15} \Omega$ cm., dielectric constant 4.5 and was excellent in electric insulating characteristics. In addition the composite layer sheet material after 6 months' preservation showed no difference with respect to both appearance and quality as compared with that immediately after production. All the characteristics after the hardening process also being substantially same in both cases.

EXAMPLE NO. 5

Epoxy resin (trade name: Epon No. 1001; melting temperature: 64–76° C.) marketed by Shell Petroleum Company Ltd. (England) is dissolved in methylisobutylketone-toluene (equal parts by volume), thereby obtaining a 50% basic solution.

Then, heat-resistant nylon paper (trade name: Nomex No. 411; thickness; 0.14 mm.) marketed by E. I. du Pont de Nemours & Co. (U.S.A.) is impregnated with the said basic solution, and then dried at 100° C. for 15 minutes, thereby obtaining fiber-reinforced resin sheet with a deposit of 120 gr./m.$^2$.

The sheet thus obtained is coated on one face thereof with a 15% mineral spirit solution of paraffin wax (fusing temperature: 85° C.), and is then dried at 80° C. for 15 minutes, thereby providing contact preventive film layer of heat-fusing type with a coating density of 10 gr./m.$^2$.

Next, a 40% toluene solution of polyamide resin (trade name: Tomide 410) marketed by Fuji Kasei Co., Ltd. (Japan) was coated on the said bonding film layer of heat-fusing type to provide hardening agent layer thereon (co-reactive resin in this case), and is then dried at 80° C. for 15 minutes, thereby obtaining composite layer sheet material with a coating density of 100 gr./m.$^2$.

After 4 months' storage at room temperature, the composite layer sheet material thus obtained was sandwiched between an epoxy glass laminated plate and "Itaya" wood. "Itaya" wood means the plywood of Acer Mono which is produced in Hokkaido, Japan. Acer Mono is a high deciduous tree of the Aceraceae family which is widely distributed in the mountains of Japan and in the vicinity thereof. The composite is hardened under a pressure of 30 kg./cm.$^2$ at 100° C. for 60 minutes. As a result of the measurement of adhesive power (bonded area 6.25 cm.$^2$) via tensile shearing force, the tensile strength was 130 kg./cm.$^2$. Moreover, the composite layer sheet material after 5 months' storage showed no difference as compared with that immediately after production with respect to both appearance and quality, the adhesiveness after the hardening process being substantially same in both cases.

EXAMPLE NO. 6

Polyester non-woven cloth (trade name: H8103) marketed by Nippon Vilene Industries Ltd. (Japan) is impregnated with a 40% solution of methylisobutylketone-toluene (equal parts by volume) (melting temperature: 75–80° C.) of epoxy resin (product of Ciba Ltd., Switzerland, trade name: CN No. 1280) and Epoxy resin (product of Shell Petroleum Company Ltd., England, trade name: Epicoat No. 1001), said epoxy resins being present in equal parts by weight and is then dried at 85° C. for 15 minutes, thereby obtaining fiber-reinforced resin sheet with a coating density of 130 gr./m.$^2$.

The sheet thus obtained is coated on one face thereof with a 10% mineral spirit solution of olefinic polymer (product of Cemedine Co., Ltd., Japan, trade name: Cemedine No. 6700) (melting temperature: 65–70° C.), and is then dried at 85° C. for 15 minutes, thereby providing a contact preventive film layer of heat-fusing type with a coating density of 10 gr./m.$^2$.

Next, the foregoing contact preventive film layer of heat-fusing type is coated with a 15% methanol solution of weight ratio 2:1 mixture of imidazole (product of Shikoku Kasei Co., Ltd., Japan, trade name: Z) as hardening agent layer and polyvinylbutyral resin (product of Electro Chemical Industrial Co., Ltd., Japan, trade name: Butyral 2000D; fusing temperature: 80–90° C.) as nonreactive modifying substance, and is then dried at 80° C. for 15 minutes, thereby obtaining a composite layer sheet material.

The composite layer sheet material thus obtained, after 2 months' storage at 45° C., is wound around an iron core having a diameter of 25 mm. and a length of 10 cm. so that the thickness will become 2.5 mm. The said composite layer sheet is subjected to a pressure of 5 kg./cm.$^2$ for 10 minutes, making use of a horizontally split metal casting mold of 30 mm. (diameter) heated at 150° C., the hot plate being heated at 170° C. by a 36-ton electric heating press.

The molding thus obtained had Shore Hardness D82 (ASTM-D-674-49T standard), dielectric breakdown voltage 34.0 and a thermal deformation temperature above 200° C. Furthermore, the composite layer sheet material after 2 months' storage showed no difference as compared with that immediately after production either in appearance or quality, all of the characteristics after the hardening process also being substantially same in both cases.

EXAMPLE NO. 7

Polyethylene terephthalate cloth (trade name: Tetoron Taffeta No. 71; thickness: 0.13 mm.) marketed by Toyo Rayon Co., Ltd. (Japan) is impregnated with a 40% toluene solution of phenol resin (product of Hitachi Chemical Industries Ltd., Japan, trade name: Hitanol No. 2180; melting temperature: 75–85° C.), and then dried at 95° C. for 15 minutes, thereby obtaining fiber-reinforced resin sheet with a deposit of 110 gr./cm.$^2$.

The said sheet is coated on one face thereof with a 10% solution of glue (melting temperature: 100–110° C.), thereby providing a contact preventive film layer of heat-fusing type with a deposit of 10 gr./m.$^2$.

Next, the said contact preventive film layer of heat-fusing type is coated with a 15% solution of paratoluene sulfonic acid as hardening agent in methylisobutylketone-toluene (equal parts by volume), and is then dried at 80° C. for 15 minutes, thereby obtaining a composite layer sheet material with a coating density of 25 gr./m.$^2$. After 3 months' storage at 40° C., the composite layer sheet material thus obtained was sandwiched between "Itaya" wood and was subjected to a pressure of 10 kg./cm.$^2$ at 110° C. for 15 minutes, as a result of which the adhesion measurement by way of tensile shearing force showed tensile strength of 100 gr./cm.$^2$. Moreover, the composite layer sheet material after 3 months storage showed no difference as compare with that immediately after production in respect of both appearance and quality, the adhesiveness after the hardening process also being substantially same in both cases.

EXAMPLE NO. 8

Polyester non-woven cloth (tradename: H-8013) marketed by Nippon Vilene Industries Ltd., Japan, is impregnated with a 40% toluene solution of phenol resin (product of Hitachi Chemical Industries Ltd., Japan, tradename: Hitanol No. 2180; melting temperature: 75–85° C.), and then is dried at 100° C. for 15 minutes, thereby obtaining fiber-reinforced resin sheet with a coating density of 100 gr./m.$^2$.

The sheet thus obtained is coated on one face thereof with a 10% mineral spirit solution of olefinic polymer (product of Cemedine Co., Ltd., Japan, trade name: Cemedine No. 6700; melting temperature: 65–70° C.) and then dried at 85° C. for 15 minutes, thereby providing a contact preventive film layer of heat-fusing type with a density of 5 gr./m.$^2$.

Next, the foregoing contact preventive film layer of heat fusing type is coated with a 10% solution of paratoluene sulfonic acid (melting point 106° C.) in methanol-water (equal parts by volume) as the hardening agent, and is then dried at 80° C. for 15 minutes, thereby obtaining composite layer sheet material with a coating density of 10 gr./m.$^2$.

EXAMPLE NO. 9

Heat-resistant nylon paper (trade name: Nomex No. 411) marketed by E. I. du Pont de Nemours & Co. (U.S.A.) is impregnated with a 30% mineral spirit solution of butyletherized melamine resin (product of Dainippon Ink and Chemicals Incorporated, Japan, trade name: Super Beccamine J–820; melting temperature: 80° C.) as hardening agent, and is then dried at 100° C. for 15 minutes, thereby obtaining hardening agent impregnated fiber sheet with a coating density of 25 gr./m.$^2$.

The sheet thus obtained is coated on one face thereof with a 10% solution of polyethylene oxide resin (product of Meisei Chemical Industry Co., Ltd., Japan, trade name: Alcox E–30; melting temperature: 67° C.), and is then dried at 90° C. for 15 minutes, thereby providing contact preventive film layer of heat-fusing type with a density of 10 gr./m.$^2$.

Next, the foregoing contact preventive film layer of heat-fusing type is coated with a 40% solution of methylisobutylketone-toluene (equal parts by volume) of epoxy resin (product of Shell Petroleum Company Ltd., Japan, trade name: Epon No. 1001) as the thermosetting resin, and is then dried at 90° C. for 15 minutes, thereby obtaining composite layer sheet material with a coating density of 90 gr./m.$^2$. After 4 months storage at room temperature, the sheet material thus obtained is cut into tape 25 mm. wide, wound three times in half-lap around a copper rod of 20 mm. diameter and 10 cm. long, and is heat-hardened at 120° C. for 30 minutes. Then, aluminum foil was wound around the entire surface of the said copper rod except 1 cm. at both ends thereof, and the result of the dielectric breakdown voltage test in oil was 12 kv./0.8 mm.

Furthermore, the composite layer sheet material after 4 months' storage showed no difference with respect to both appearance and quality as compared with that immediately after production, the dielectric breakdown voltage also being substantially same in both cases.

EXAMPLE 10

Glass cloth (trade name: LPC–131H$_2$) marketed by Arisawa Mfg. Co., Ltd. (Japan) is impregnated with a 50% solution of methylisobutylketone-toluene (equal parts by volume) of epoxy resin (product of Shell Petroleum Company Ltd., England, trade name: Epon No. 1001; melting temperature: 64–76° C.), and is then dried at 80° C. for 20 minutes, thereby obtaining fiber-reinforced resin sheet with a coating density of 164 gr./m.$^2$. The sheet thus obtained is coated on one face thereof with a 50% methanol solution of vinyl acetate resin (product of Nissetsu Co., Ltd., Japan, trade name: P–170; melting temperature: 50–60° C.), and is then dried at 80° C. for 10 minutes, thereby providing contact preventive film layer of heat-fusing type with a coating density of 15 gr./m.$^2$.

On the other hand, glass cloth (trade name: LPC–131H$_2$) marketed by Arisawa Mfg. Co., Ltd. (Japan) is impregnated with a 40% toluene solution of polyamide resin (product of Fuji Kasei Co., Ltd., Japan, trade name: Tomide No. 410; melting temperature: 60–70° C.), and then dried at 80° C. for 20 minutes, thereby obtaining hardening agent impregnated fiber sheet with a coating density of 165 gr./m.$^2$.

Next, the fiber-reinforced resin sheet provided with contact preventive film layer of heat-fusing type on one face thereof is superimposed on the hardening agent impregnated fiber sheet so that the said film layer will face the latter sheet, both sheets being bonded together by means of a roller heated to 50° C., thereby obtaining composite layer sheet material.

The construction of the foregoing composite layer sheet material is illustrated in FIG. 3, in which the numeral 1 depicts glass cloth, 2 is the epoxy resin layer, 3 is the contact preventive film layer of heat-fusing type, and 4 is hardening agent layer, respectively.

After 6 months' storage at room temperature, the composite layer sheet material thus obtained was laid in a sevenfold pile, and subjected to a pressure of 5 kg./cm.$^2$ at 150° C. for 10 minutes, thereby obtaining a laminated sheet 1.5 mm. in thickness.

This laminated plate showed satisfactory electrical and mechanical characteristics; volume resistivity $1.0 \times 10$ $\Omega$/cm. dielectric loss tangent (60 Hz.) 1.5%, dielectric breakdown strength 20 kg./cm.$^2$. The composite layer sheet material after 6 months' storage showed no difference in respect of both appearance and quality as compared with that immediately after production, all the characteristics after the hardening process also being substantially same in both cases.

EXAMPLE NO. 11

Glass cloth (product of Arisawa Mfg. Co., Ltd., Japan, trade name: LPC–131H$_2$) is impregnated with a 50% solution of acetone-toluene (1:1 by volume) of weight ratio 2:1 mixture of epoxy resin (product of Shell Petroleum Company Ltd., England, trade name: Epon No. 1031; melting temperature: 80° C.) and polyvinylbutyral (product of Electro Chemical Industrial Co., Ltd., Japan, trade name: Butyral 2000D; fusing temperature 80–90° C.) as nonreactive modifying substance, and is then dried at 80° C. for 20 minutes, thereby obtaining fiber-reinforced resin sheet with a density of 140 gr./m.$^2$.

The sheet thus obtained is coated on one face thereof with a 10% solution of methanol-toluene (equal parts by volume) of vinyl acetate-acrylic acid co-polymer resin (product of Nissetsu Co., Ltd., Japan, trade name: PE–650; melting temperature: 61–65° C.), and is then dried at 80° C. for 10 minutes, thereby providing contact preventive film layer of heat-fusing type with a coating density of 10 gr./m.$^2$.

Next, the said contact preventive film layer of heat-fusing type is coated with a 15% solution of toluene-methanol (equal by volume) imidazole (product of BASF Ltd., Germany, trade name: Z; melting temperature: 88° C.) as the hardening agent layer and vinyl acetate resin product of Nissetsu Co., Ltd., Japan, trade name: P–170) as non-reactive modifying substance (two parts by weight imidazole per part modifier) for the purpose of imparting adhesiveness, and is then dried at 75° C. for 15 minutes, thereby obtaining composite layer sheet material with a coating density of 15 gr./m.$^2$.

This sheet material after 5 months' storage at room temperature was subjected to a pressure of 5 kg./cm.$^2$ at 150° C. for 10 minutes, thereby obtaining a laminated plate 1.1 mm. in thickness. The volume resistivity thereof was $4.46 \times 10^{15}$ $\Omega$/cm., dielectric constant 6.5, dielectric loss tangent 0.66%, dielectric breakdown strength 31.7 kv./mm. and tensile strength 15.3 kg./cm.$^2$. Furthermore, the composite layer sheet material after 5 minutes' preservation showed no difference with respect to both appearance and quality as compared with that immediately after production, all the characteristics after the hardening process also being substantially same in both cases.

What is claimed is:

1. A composite layer sheet material hardenable by heating within the range of 50° C. to 150° C. and consisting of successive layers comprising a thermosetting resin layer, a heat-fusible type contact-preventive film layer and a highly reactive hardening agent layer, said thermosetting resin layer being separated from said hardening agent layer by said contact-preventive film layer before heating, it being so adapted that said thermosetting resin layer and said hardening agent layer are fused, mixed and hardened after said heat-fusible type contact-preventive film layer has been fused by heating, each layer being bonded to each adjacent layer, fibrous base member being embedded at least in either of said thermosetting resin layer and said highly reactive hardening agent layer, said heat-fusible type contact-preventive film layer having a fusing temperature either substantially the same or slightly lower than that of the remaining two layers.

2. A composite layer sheet material as defined in claim 1, wherein the coating density of the heat-fusible type contact-preventive film layer is 0.5–15 g./m.$^2$.

3. A laminated plate produced by laminating and heat-hardening the composite layer sheet material as defined in claim 1.

4. An electrically insulated material wherein the composite layer sheet material as defined in claim 1 is wrapped about an electric conductor and then hardened by heating.

5. A composite layer sheet material as defined in claim 1 wherein the fusing temperature of the heat-fusible type contact preventive film layer differs within a temperature range of 50° C. from that of the thermosetting resin layer and the highly reactive hardening agent layer.

6. A composite layer sheet material as defined in claim 1, wherein the thermosetting resin consists of an epoxy resin, and the hardening agent consists of an aliphatic amine, imadazoline, imidazole or a polyamide resin.

7. A composite layer sheet material as defined in claim 6, wherein the fibrous base member is selected from the group consisting of glass fibers, asbestos fibers, polyester fibers and polypropylene fibers.

8. A composite sheet material according to claim 7, wherein the contact-preventive film is selected from the group consisting of polyethylene, polyvinyl chloride, polyethylene oxide, polyacrylate esters and copolymers of ethylene and vinyl acetate.

References Cited

UNITED STATES PATENTS

| | | | |
|---|---|---|---|
| 3,395,105 | 7/1968 | Washburn et al. | 161—185 X |
| 3,539,409 | 11/1970 | Stone | 156—56 |
| 3,458,389 | 7/1969 | Mertens | 161—188 X |
| 3,386,878 | 6/1968 | Pooley | 161—188 |
| 3,390,037 | 6/1968 | Christie | 161—188 X |
| 3,437,542 | 4/1969 | Mills | 161—188 X |
| 3,450,594 | 6/1969 | Hennessy | 161—184 |
| 3,536,654 | 10/1970 | Lantz et al. | 161—185 X |
| 3,556,692 | 1/1971 | Mertens | 161—184 X |
| 3,562,081 | 2/1971 | Stalego | 161—185 X |
| 3,563,850 | 2/1971 | Stackhouse et al. | 161—185 X |
| 3,571,491 | 3/1971 | Markowski | 161—185 X |
| 3,576,686 | 4/1971 | Schmidle et al. | 156—155 X |
| 3,578,727 | 5/1971 | Battersby et al. | 161—186 X |
| 3,591,433 | 7/1971 | Andreassen | 156—53 |

HAROLD ANSHER, Primary Examiner

U.S. Cl. X.R.

156—53, 155, 309; 161—188, Digest 1; 174—110 E, 121 SR, 122 C